US010628160B2

(12) United States Patent
Ekman et al.

(10) Patent No.: US 10,628,160 B2
(45) Date of Patent: *Apr. 21, 2020

(54) SELECTIVE POISONING OF DATA DURING RUNAHEAD

(71) Applicant: NVIDIA Corporation, Santa Clara, CA (US)

(72) Inventors: Magnus Ekman, Alameda, CA (US); James Van Zoeren, Albuquerque, NM (US); Paul Serris, San Jose, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/943,509

(22) Filed: Apr. 2, 2018

(65) Prior Publication Data

US 2018/0225121 A1 Aug. 9, 2018

Related U.S. Application Data

(63) Continuation of application No. 13/662,171, filed on Oct. 26, 2012, now Pat. No. 10,001,996.

(51) Int. Cl.
*G06F 9/30* (2018.01)
*G06F 11/30* (2006.01)
(Continued)

(52) U.S. Cl.
CPC ........ *G06F 9/30189* (2013.01); *G06F 9/3842* (2013.01); *G06F 11/3024* (2013.01); *G06F 11/3409* (2013.01); *G06F 2201/885* (2013.01)

(58) Field of Classification Search
CPC ..................................................... G06F 9/3842
(Continued)

(56) References Cited

U.S. PATENT DOCUMENTS 5,487,146 A 1/1996 Guttag et al.
5,721,855 A 2/1998 Hinton et al.
(Continued)

FOREIGN PATENT DOCUMENTS

CN 1519728 8/2004
CN 1629799 6/2005
(Continued)

OTHER PUBLICATIONS

O. Mutlu, H. Kim, and Y.N. Patt. Techniques for Efficient Processing in Runahead Execution Engines. In ISCA, pp. 370-381, Jun. 2005. (Year: 2005).*
(Continued)

*Primary Examiner* — Michael J Metzger
(74) *Attorney, Agent, or Firm* — Zilka-Kotab, PC (57) ABSTRACT

Embodiments related to selecting a runahead poison policy from a plurality of runahead poison policies during microprocessor operation are provided. The example method includes causing the microprocessor to enter runahead upon detection of a runahead event and implementing a first runahead poison policy selected from a plurality of runahead poison policies operative to manage runahead poison injection during runahead. The example method also includes during microprocessor operation, selecting a second runahead poison policy operative to manage runahead poison injection differently from the first runahead poison policy.

10 Claims, 4 Drawing Sheets

(51) Int. Cl.
*G06F 11/34* (2006.01)
*G06F 9/38* (2018.01)

(58) Field of Classification Search
USPC .......................................................... 712/229
See application file for complete search history.

(56) References Cited

U.S. PATENT DOCUMENTS

| | | | |
|---|---|---|---|
| 5,864,692 | A | 1/1999 | Faraboschi et al. |
| 5,870,582 | A | 2/1999 | Cheong et al. |
| 5,956,753 | A | 9/1999 | Glew et al. |
| 6,037,946 | A | 3/2000 | Takeda |
| 6,484,254 | B1 | 11/2002 | Chowdhury et al. |
| 6,519,694 | B2 | 2/2003 | Harris |
| 6,665,792 | B1 | 12/2003 | Merchant et al. |
| 7,010,648 | B2 | 3/2006 | Kadambi et al. |
| 7,062,631 | B1 | 6/2006 | Klaiber et al. |
| 7,117,330 | B1 | 10/2006 | Alverson et al. |
| 7,194,604 | B2 | 3/2007 | Bigelow et al. |
| 7,293,161 | B1 | 11/2007 | Chaudhry et al. |
| 7,421,567 | B2 | 9/2008 | Eickemeyer et al. |
| 7,587,584 | B2 | 9/2009 | Enright et al. |
| 7,752,627 | B2 | 7/2010 | Jones et al. |
| 7,873,793 | B1 | 1/2011 | Rozas et al. |
| 7,890,735 | B2 | 2/2011 | Tran |
| 8,035,648 | B1 | 10/2011 | Wloka et al. |
| 8,707,011 | B1 | 4/2014 | Glasco et al. |
| 9,632,976 | B2 | 4/2017 | Rozas et al. |
| 2003/0018685 | A1 | 1/2003 | Kalafatis et al. |
| 2003/0196010 | A1 | 10/2003 | Forin et al. |
| 2004/0128448 | A1 | 7/2004 | Stark et al. |
| 2005/0041031 | A1 | 2/2005 | Diard |
| 2005/0055533 | A1 | 3/2005 | Kadambi et al. |
| 2005/0138332 | A1 | 6/2005 | Kottapalli et al. |
| 2005/0154831 | A1 | 7/2005 | Steely, Jr. et al. |
| 2006/0010309 | A1 | 1/2006 | Chaudhry et al. |
| 2006/0095678 | A1 | 5/2006 | Bigelow et al. |
| 2006/0149931 | A1 | 7/2006 | Haitham et al. |
| 2006/0174228 | A1 | 8/2006 | Radhakrishnan et al. |
| 2006/0179279 | A1 | 8/2006 | Jones et al. |
| 2006/0212688 | A1 | 9/2006 | Chaudhry et al. |
| 2006/0277398 | A1 | 12/2006 | Akkary et al. |
| 2007/0074006 | A1 | 3/2007 | Martinez et al. |
| 2007/0174555 | A1 | 7/2007 | Burtscher et al. |
| 2007/0186081 | A1 | 8/2007 | Chaudhry et al. |
| 2007/0204137 | A1 | 8/2007 | Tran |
| 2009/0019317 | A1 | 1/2009 | Quach et al. |
| 2009/0327661 | A1 | 12/2009 | Sperber et al. |
| 2010/0199045 | A1 | 8/2010 | Bell et al. |
| 2010/0205402 | A1 | 8/2010 | Henry et al. |
| 2010/0205415 | A1 | 8/2010 | Henry et al. |
| 2011/0264862 | A1 | 10/2011 | Karlsson et al. |
| 2012/0023359 | A1 | 1/2012 | Edmeades et al. |
| 2012/0089819 | A1 | 4/2012 | Chaudhry et al. |
| 2013/0124829 | A1 | 5/2013 | Chou et al. |
| 2014/0082291 | A1 | 3/2014 | Van Zoeren et al. |
| 2014/0122805 | A1 | 5/2014 | Ekman et al. |
| 2014/0136891 | A1 | 5/2014 | Holmer et al. |
| 2014/0164736 | A1 | 6/2014 | Rozas et al. |
| 2014/0164738 | A1 | 6/2014 | Ekman et al. |
| 2014/0281259 | A1 | 9/2014 | Klaiber et al. |
| 2015/0026443 | A1 | 1/2015 | Kumar et al. |
| 2017/0199778 | A1 | 7/2017 | Ekman et al. |

FOREIGN PATENT DOCUMENTS

| | | |
|---|---|---|
| CN | 1831757 | 9/2006 |
| CN | 102184127 | 9/2011 |
| CN | 103793205 | 5/2014 |
| DE | 102013218370 | 3/2014 |
| EP | 0671718 | 9/1995 |
| GB | 2287111 | 9/1995 |
| TW | 200405201 | 4/2004 |
| TW | 200529071 | 9/2005 |
| TW | I263938 | 10/2006 |
| TW | I275938 | 3/2007 |
| TW | 200723111 | 6/2007 |
| TW | 200809514 | 2/2008 |
| TW | I315488 | 10/2009 |
| TW | 201032627 | 9/2010 |
| TW | 201112254 | 4/2011 |
| TW | I425418 | 2/2014 |
| TW | 201439765 | 10/2014 |
| TW | I536167 | 6/2016 |

OTHER PUBLICATIONS

M. Hashemi and Y.N. Patt. Filtered Runahead Execution with a Runahead Buffer. In MICRO-48, 2015. (Year: 2015).*

Altera, "Implementing a Queue Manager in Traffic Management Systems," Feb. 2004, pp. 1-8.

Wikipedia article, "Instruction Prefetch," https://en.wikipedia.org/wiki/Instruction_prefetch, downloaded May 23, 2016, pp. 1-4.

Wikipedia article, "x86," https://en.wikipedia.org/wiki/X86, downloaded May 23, 2016, pp. 1-38.

Rozas, Guillermo J. et al., "Lazy Runahead Operation for a Microprocessor," U.S. Appl. No. 13/708,645, filed Dec. 7, 2012, pp. 1-32.

Homer, Bruce et al., "Managing Potentially Invalid Results During Runahead," U.S. Appl. No. 13/677,085, filed Nov. 14, 2012, pp. 1-29.

Ekman, Magnus et al., "Instruction Categorization for Runahead Operation," U.S. Appl. No. 13/708,544, filed Dec. 7, 2012, pp. 1-32.

Adve, S. et al., "Shared Memory Consistency Models: A Tutorial," WRL Research Report 95/7, Western Research Laboratory, Sep. 1995, Entire Document.

Dundas, J. et al., "Improving Data Cache Performance by Pre-Executing Instructions Under a Cache Miss," ICS '97, Proceedings of the 11th International Conference on Supercomputing, Jul. 7, 1997, pp. 68-75.

Mutlu, O. et al., "Runahead Execution: An Alternative to Very Large Instruction Windows for Out-Of-Order Processors," HPCA-9 2003, Proceedings of the 9th International Symposium on High-Performance Computer Architecture, Feb. 12, 2003, 12 pages.

"Intel Itanium Architecture Software Developer's Manual," Intel, http://www.intel.com/design/itanium/manuals/iiasdmanual.htm, 1 page.

Chaudry, S. et al., "High-Performance Throughput Computing," IEEE Micro, vol. 25, Issue 3, May 2005, pp. 32-45.

Dehnert, et al., "The Transmeta Code Morphing Software: Using Speculation, Recovery, and Adaptive Retranslation to Address Real-Life Challenges," IEEE, CGO '03 Proceedings of the International Symposium on Code Generation and Optimization, Mar. 23, 2003, pp. 15-24.

Ekman, M. et al., "Selective Poisoning of Data During Runahead," U.S. Appl. No. 13/662,171, filed Oct. 26, 2012, pp. 1-33.

Rozas, Guillermo J. et al., "Queued Instruction Re-Dispatch After Runahead," U.S. Appl. No. 13/730,407, filed Dec. 28, 2012, pp. 1-36.

* cited by examiner

SELECTIVE POISONING OF DATA DURING RUNAHEAD

RELATED APPLICATION(S)

This application is a Continuation Application of co-pending, commonly owned U.S. patent application Ser. No. 13/662,171, filed Oct. 26, 2012, entitled "Selective Poisoning of Data During Runahead," to Ekman et al., which is hereby incorporated herein by reference in its entirety.

BACKGROUND

Instructions in microprocessors sometimes stall, halting forward progress until the stall is resolved. Because it may be helpful to uncover other independent stalls among subsequent instructions, the microprocessor may perform a runahead operation configured to detect other stalls while the initial stall is being resolved. While runahead may uncover other potential stalls, continued execution with missing or invalid data may pollute the cache.

DETAILED DESCRIPTION

In modern microprocessors, instructions are often executed in a pipeline. Such instructions may be issued individually or as bundles of micro-operations to various execution mechanisms in the pipeline. Regardless of the form of the instruction when issued for execution, when the instruction is issued, it may not be known at dispatch whether a miss or an exception will arise during execution of the instruction. It may take some time to resolve some misses/exceptions before the microprocessor is able to make progress on subsequent instructions. Thus, the microprocessor may stall while attempting to resolve the underlying cause of the long-latency event.

Some microprocessors may be configured to speculatively execute instructions while the underlying cause for a stall is being resolved. The speculative execution is typically aimed at discovering other potential stalls so that the microprocessor may begin resolving those as well, potentially saving processing time. In some settings, it may be desirable to uncover as many potential stalls as possible before the initial stall event is resolved and normal operation resumes.

Thus, one goal of the microprocessor may be to speculatively process as many instructions as possible. However, because the microprocessor is operating in a regime where it is probable that some of the results generated will be invalid, one or more invalid results may be referenced in memory requests that might lead to cache pollution after speculative operation ends.

A common pipeline execution stall that may arise during execution of an instruction is a load miss. Put another way, a stall may result from a load request where a requested data is not present at a particular location in cached memory, causing a long-latency event while the data is retrieved from another location (e.g., at a higher cache level). Such load misses may trigger an entrance into a runahead mode of operation (hereafter referred to as "runahead") that is configured to detect, for example, other cache misses (e.g., store misses and/or load misses), instruction fetch misses, misses in translation lookaside buffers (e.g., for instructions or data), and/or branch mispredicts while the initial load miss is being resolved.

As used herein, runahead describes any suitable speculative execution scheme performed during a long-latency event that triggers an unresolved state in the microprocessor. It will be appreciated that the nature and identity of such long-latency events may vary. Other non-limiting examples of long-latency events include store misses and some long-latency floating point operations (e.g., denormal square root operations). Once the runahead-triggering event is detected, the state of the microprocessor (e.g., the registers and other suitable states) may be checkpointed so that the microprocessor may return to that state after runahead. The microprocessor then continues executing in a working state during runahead. After the initial long-latency event is resolved, the microprocessor exits runahead and normal operation resumes.

Because runahead operation is a speculative execution scheme and is often initiated due to certain data being unavailable, at least some of the data used and/or generated during runahead will be invalid. While runahead may provide the benefit of uncovering other misses or long-latency events, the use of missing or invalid data may pollute processor registers and/or portions of the memory system. Some past approaches augment registers with poison bits during runahead so that invalid data may be tracked during runahead operation. If an instruction uses a poisoned register as a source (e.g., an input register), the microprocessor sets the poison bit for the destination register to indicate that the associated destination register includes invalid information. In some instances, a microprocessor may clear a poisoned destination register when that register's content is overwritten. For example, if an instruction uses a non-poisoned input register as a source, the microprocessor may clear the poison bit at the associated destination register.

Regardless of how poison is introduced, propagated, and/or cleared during runahead, the poisoning schemes in prior systems are predetermined during a design phase that occurs before the microprocessor is manufactured and becomes operational. Consequently, the chosen poisoning scheme may enhance microprocessor operation in some situations but slow execution in some others. A poisoning scheme that delays poison injection may introduce less poison in comparison to a poisoning scheme that quickly introduces poison. In turn, less poison may increase the opportunity for the system to make a request that will result in a hit in the future. However, delaying poison injection may reduce the number of instructions that can be observed during runahead relative to faster-acting poisoning schemes.

Consequently, fewer potential stalls may be uncovered as poison injection is delayed to comparatively later times.

Accordingly, the embodiments described herein relate to methods, hardware, and/or software configured to select a runahead poison policy from a plurality of runahead poison policies during microprocessor operation. For example, one embodiment of a method of operating a microprocessor includes implementing a first runahead poison policy selected from a plurality of runahead poison policies operative to manage runahead poison injection during runahead. The example method also includes, at a later point during microprocessor operation, selecting a second runahead poison policy operative to manage runahead poison injection differently from the first runahead poison policy.

Figure 1:
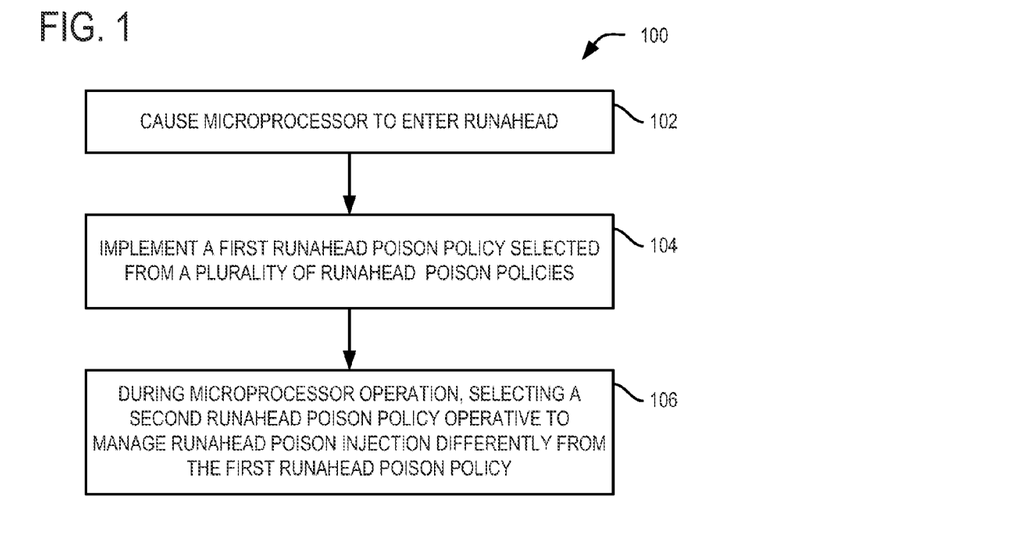
FIG. 1 depicts an example method of selecting a runahead poison policy from a plurality of runahead poison policies during microprocessor operation according to an embodiment of the present disclosure.

FIG. 1 shows a flow chart for an embodiment of a method 100 for selecting a runahead poison policy from a plurality of runahead poison policies during microprocessor operation. Method 100 comprises, at 102, causing a microprocessor to enter runahead. At 104, method 100 includes implementing a first runahead poison policy selected from a plurality of runahead poison policies operative to manage runahead poison injection during runahead. At 106, method 100 comprises selecting a second runahead poison policy operative to manage runahead poison injection differently from the first runahead poison policy. While the depicted method may be performed in connection with any suitable hardware and/or software configuration, it will be appreciated that modifications, additions, and refinements may be made to these steps in accordance with the methods and hardware shown and described herein.

In some embodiments, a particular runahead poison policy may be selected for application according to a relative hit to miss rate in a selected cache level. For example, in a situation where an application experiences a runahead-triggering miss in an L1 cache, the relative hit to miss rate in an L2 cache may be used to choose a runahead poison policy during microprocessor operation. In a scenario where the L2 cache has a higher miss rate than a hit rate, a runahead poison policy that immediately injects poison on the L1 miss may be selected, potentially enhancing instruction throughput during runahead. In this scenario there may be a high probability that poison will be injected at some point. Poisoning immediately may allow the microprocessor to traverse more instructions relative to a poisoning scheme that waits to injection poison based on whether the instruction also misses in the L2 cache.

Because operating conditions in the microprocessor may change over time, at some point it may be more likely than not that a miss in the L1 cache will lead to a hit in the L2 cache. Early poisoning (e.g., injecting poison immediately after detection of the L1 miss or another aggressive approach to injecting poison) may be undesirable, as the poison added would lead to missed opportunities to send further miss requests that otherwise might not have occurred if the L2 cache returned a hit. In this context, it may be more desirable to insert a delay into runahead operation, as the immediate delay may avoid one or more future delays that may result from pointer chasing (e.g., where poisoned register locations become input register locations for subsequent instructions, causing cascading delays within the system). Thus, a runahead poison policy that waits to inject poison on detection of an L2 miss may be selected in a scenario where the L2 cache has a higher hit rate than a miss rate. This approach may enhance operation by reducing overall poison levels within the system, potentially reducing subsequent stall events because the delay allowed the data to be obtained from the L2 cache.

Runahead poison policy selection is performed at runtime. Selecting a runahead poison policy during microprocessor operation may allow the microprocessor to adapt to operational situations, like those described above, which may change over time. Accordingly, one runahead poison policy may be selected according to a particular operating condition. If the operating condition changes, an alternate runahead poison policy may be selected if that policy might lead to comparatively enhanced operational performance.

In some embodiments, a different runahead poison policy may be selected based upon a change in an operation context at the microprocessor. For example, a different runahead poison policy may be selected in response to a context change triggered by code executing at the microprocessor. In some of such embodiments, the context change may be predetermined (e.g., during a design phase before runtime) so that a particular runahead poison policy will be selected to accompany a selected portion of the code or a context type, as that particular policy may help the microprocessor achieve enhanced performance relative to another policy.

Additionally or alternatively, in some embodiments, a different runahead poison policy may be selected dynamically during operation, even if there is no accompanying change in operation context or application. Thus, runahead poison policy selection may respond to circumstances that are constantly in flux during microprocessor operation even if such circumstances were unforeseen at a design phase.

Figure 2:
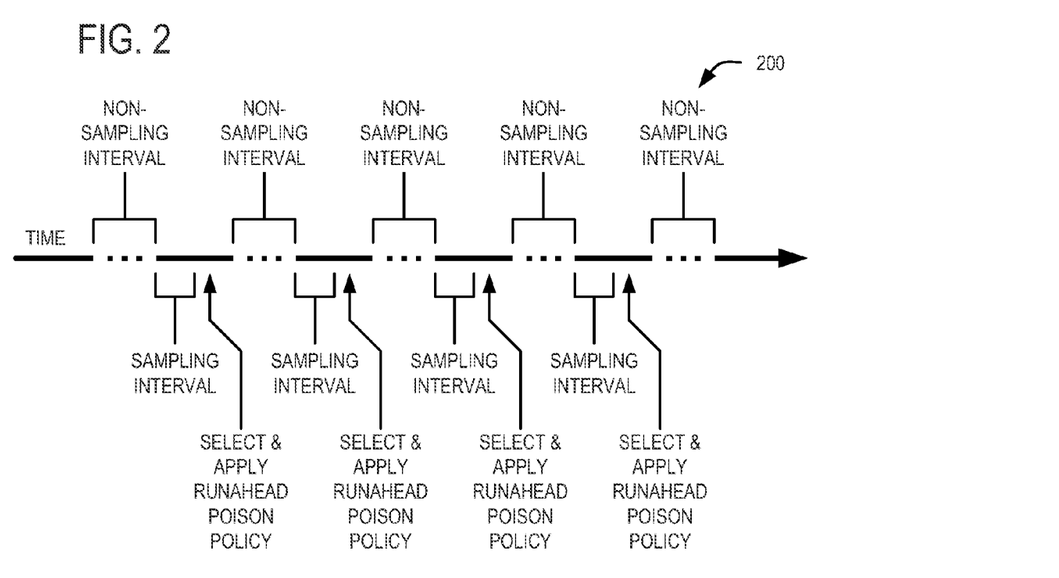
FIG. 2 depicts another example method of selecting a runahead poison policy from a plurality of runahead poison policies during microprocessor operation according to an embodiment of the present disclosure.

FIG. 2 schematically shows an example method 200 of selecting a runahead poison policy from a plurality of runahead poison policies during microprocessor operation. As shown in FIG. 2, one or more performance information of the microprocessor are sampled during a sampling interval to ascertain microprocessor performance, instantaneously and/or relative to the sampling interval. As used herein, a sampling interval refers to an interval during which microprocessor performance using a particular runahead poison policy is observed/measured. In some embodiments, the sampling interval may be configured as a predetermined time interval, a span of a predetermined number of instructions or runahead instances, or any suitable observation window during which microprocessor performance using a particular runahead poison policy may be monitored. Preferably the sampling interval is configured so that it includes at least a portion of a runahead instance so that the sampling interval observes the runahead poison policy in operation. In some embodiments, a sampling interval may be within a range of 1,000 to 1,000,000 clock cycles.

Any suitable microprocessor performance information may be sampled during the sampling interval. In some embodiments, microprocessor performance information may include observable/measureable attributes of the microprocessor. Non-limiting examples of microprocessor performance information include information indicative of instruction throughput, such as a count of instructions per clock cycle (e.g., a higher instruction count per clock cycle indicating greater instruction throughput) and/or a count of clock cycles per preselected number of instructions (e.g., a lower count of clock cycles to process the preselected number of instructions indicating greater instruction throughput); and information indicative of hit rates at various levels of the cache (e.g., (number of hits at a cache level)/(number of hits+misses at that cache level)) and/or various counters configured to indicate hits or misses in the cache.

In some embodiments, microprocessor performance information may include information about microprocessor performance that is derived from measureable/observable microprocessor attributes. For example, application or microprocessor context identity information or any other information associated with an instruction or instructions being executed when the microprocessor performance information was obtained may be included with the microprocessor performance information. Alternatively or additionally, in some embodiments, such associated information may be obtainable with reference to the microprocessor performance information (e.g., with reference to a time stamp, chronological or storage order, etc.).

Any suitable manner of obtaining microprocessor performance information may be employed without departing from the scope of the present disclosure. For example, microprocessor performance information may be obtained by measuring one or more microprocessor performance values during the sampling interval. Once obtained, the performance information may be stored for later reference. Storing the performance information associated with the second runahead poison policy may allow comparison with subsequently-collected performance information associated with the same or other runahead poison policies. For example, performance information for instruction throughput (e.g., instructions processed per unit time or instructions processed per clock cycle) associated with the first runahead poison policy may be compared with throughput information associated with the same or a different poison policy at a later time.

Once characterized, the microprocessor performance information may be used to select one of a plurality of runahead poison policies. It will be appreciated that selection of a particular runahead poison policy may occur at any suitable time during microprocessor operation. For example, selection may occur during runahead and/or normal operation.

The performance characterizations described above may consume some microprocessor resources (e.g., calculation and/or storage resources). Accordingly, in some embodiments, an optional non-sampling interval may be provided to space apart two or more sampling intervals so that sampling occurs intermittently. Separating the sampling intervals with a non-sampling interval of comparatively longer duration may spread the computational overhead. If included, the non-sampling interval may be sized so that the microprocessor may experience ordinary operations (e.g., normal computation) and one or more instances of runahead operation before a next sampling interval occurs. In some embodiments, the non-sampling interval may be configured as a predetermined time interval, a span of a predetermined number of instructions, or a predetermined number of runahead instances. In some embodiments, a non-sampling interval may be within a range of 100,000-10,000,000 clock cycles. Consequently, any runahead instances that may occur during the non-sampling interval experience the currently-applied runahead poison policy.

While the non-sampling intervals shown in FIG. 2 are shown as having approximately identical duration, it will be appreciated that in some embodiments, the duration of the non-sampling interval may vary from instance to instance. For example, in some embodiments, the non-sampling interval may vary according to an application identity or any other suitable factor or factors. Likewise, it will be appreciated that the sampling interval may vary from instance to instance as well. In some examples, the sampling interval may be adjusted in response to an application identity or any other suitable factor or factors.

Figure 3:
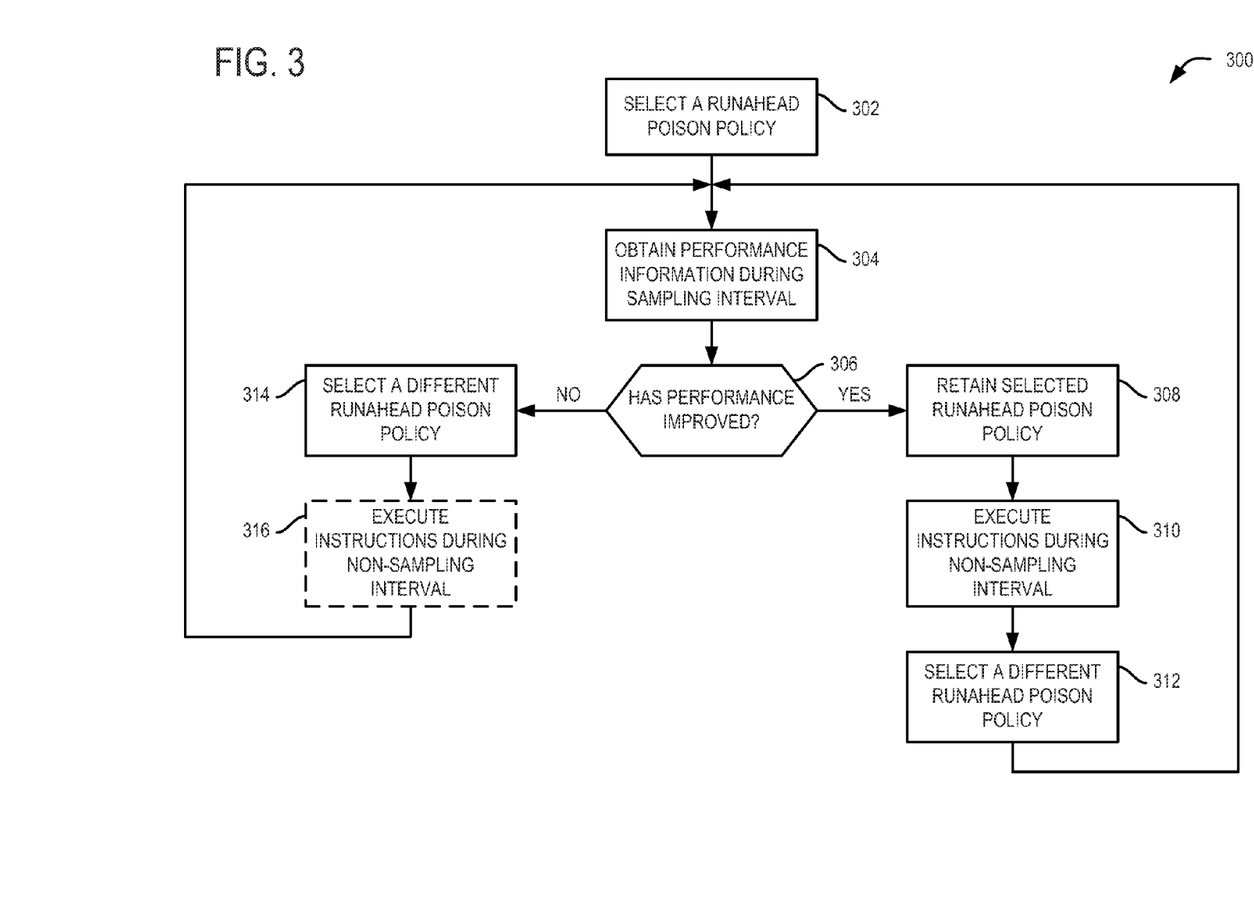
FIG. 3 depicts yet another example method of selecting a runahead poison policy from a plurality of runahead poison policies during microprocessor operation according to an embodiment of the present disclosure.

FIG. 3 shows a flow chart for an example method 300 of selecting a runahead poison policy from a plurality of runahead poison policies during microprocessor operation. It will be appreciated that embodiments of method 300 may be performed by any suitable hardware and software, including the hardware and software described herein. It will be appreciated that portions of the processes described in method 300 and the other methods herein may be omitted, reordered, performed simultaneously in parallel and/or supplemented without departing from the scope of the present disclosure.

As shown in FIG. 3, method 300 includes, at 302, selecting a first runahead poison policy. In some embodiments, selecting a first runahead poison policy at 302 may include setting poisoning control bit to a value associated with the first runahead poison policy. A poisoning control bit may be used to track and/or apply a particular runahead poison policy. In some embodiments, a poisoning control bit may be included in poisoning control logic as described in more detail below. Briefly, in some embodiments, poisoning control logic may assess microprocessor performance during runahead and/or normal operation and select a runahead poison policy accordingly. In such embodiments, the poisoning control logic may set a value for a poisoning control bit and/or read/respond to a value of the poisoning control bit. In some embodiments, the first runahead poison policy may be selected from a policy buffer configured to store a plurality of runahead poison policies.

At 304, method 300 includes obtaining microprocessor performance information during a sampling interval using the first runahead poison policy. The microprocessor performance information may be obtained in any suitable way, in any suitable sampling interval, including those described above in method 200. In some embodiments, the performance information obtained (and, in some embodiments, related microprocessor/application information) may be stored for later reference.

At 306, method 300 includes determining whether performance has been enhanced using the selected runahead poison policy. The determination may be made with reference to any suitable performance metric. Regardless of what metric is used to judge performance or how the metric is obtained, a runahead poison policy used by the microprocessor is selected at runtime. Occasionally, a different runahead poison policy may be selected to determine if performance may be relatively enhanced using the different runahead poison policy.

In some embodiments, the performance information may be compared with performance-related information associated with the same or a different runahead poison policy collected at any suitable earlier time. For example, instruction throughput using a currently-selected runahead poison policy may be compared to instruction throughput at an earlier time using the currently-selected runahead poison policy or a different runahead poison policy. In some embodiments, the comparison may be between successive runahead poison policies (e.g., a comparison between performance information related to a first runahead poison policy and performance information related to a second runahead poison policy selected immediately after the first poison policy). In some of such embodiments, comparisons therefore may be made between most recent performance information for the respective runahead poison policies.

In some embodiments, such determinations may be made based on comparisons of microprocessor performance information obtained at any suitable time and preselected reference information. In some of such embodiments, the preselected reference information may be updated by historic performance information within a predetermined subset of historic information or of all available historic performance information. Thus, determinations may be made in view of moving averages, extrema, and so on, which may be updated over time.

In the example shown in FIG. 3, if performance is enhanced using the selected runahead poison policy, the selected runahead poison policy is retained at 308. Method 300 then continues to 310, comprising executing instructions during a non-sampling interval. Thus, method 300 continues operating according to the second runahead poison policy for the duration of that non-sampling interval. Any suitable non-sampling interval may be employed without departing from the present disclosure, including the non-sampling interval described above in method 200. However, because conditions may change within the microprocessor that may make the selected runahead poison policy comparatively less efficient relative to another runahead poison policy, method 300 includes, at 312, selecting a different runahead poison policy and then returning to 304 so that performance information using the different runahead poison policy may be obtained and a new performance determination made.

In some embodiments, selecting a different runahead poison policy at 312 may include setting a poisoning control bit to a different value associated with the different runahead poison policy. For example, a value of the poisoning control bit may be flipped from a value associated with a first runahead poison policy to a value associated with a second runahead poison policy. In turn, the microprocessor may stop applying the first poison runahead poison policy and begin applying the second runahead poison policy. In some embodiments, a selected runahead poison policy may be chosen from a policy buffer configured to store a plurality of runahead poison policies.

If performance is not enhanced using the selected runahead poison policy, method 300 skips to 314, where a different runahead poison policy is selected. Because microprocessor operational conditions may be in a constant state of flux, selection of a different runahead poison policy may lead to performance/operational enhancement relative to the earlier-selected runahead poison policy. In some embodiments, method 300 may include, at 316, executing instructions during a non-sampling interval using the newly-selected different runahead poison policy. Alternatively, in some other embodiments, method 300 may return immediately to 304 upon selection of a different runahead poison policy so that the performance of the newly-selected runahead poison policy may be evaluated. It will be appreciated that in some settings immediate evaluation of the newly-selected runahead poison policy may allow the microprocessor to identify (and in some settings, optimize) a runahead poison policy appropriate to the instant microprocessor operating conditions, code, etc. Alternatively, in some settings the inclusion of a non-sampling interval may reduce computational overhead as described above.

While the embodiment of method 300 described above relates to an example where microprocessor performance is compared between a current runahead poison policy and a most recent prior runahead poison policy, it will be appreciated that comparisons of any suitable microprocessor performance information related to any suitable past and/or present runahead poison policy may be employed without departing from the scope of the present disclosure. Moreover, while the embodiment of method 300 discussed above relates to an example that alternates between two runahead poison policies, it will be appreciated that any suitable number of runahead poison policies may be employed without departing from the scope of the present disclosure. For example, in some embodiments, method 300 may be used with three or more runahead poison policies.

Runahead poison policy selection may be managed in view of the goals of increasing instruction throughput during runahead and decreasing poison content. In some settings, these goals may depend on the relative hit rate among cache levels. For example, if instructions have a high miss rate in an L2 cache after a corresponding miss in an L1 cache, it is likely that poison will be included in the system regardless of whether poison is injected early or late. Because the opportunities to decrease poison content are correspondingly low, a runahead poison policy favoring early poison injection may at least promote the goal of increasing instruction throughput in runahead so that other potential stalls may be uncovered. Alternatively, if instructions have a high hit rate in the L2 cache after a corresponding miss in the L1 cache, poison content may be reduced if a runahead poison policy favoring late poison injection is implemented. As introduced above, in some embodiments, selection may be based on a particular context/program/application encountered during runtime and/or on performance observations made dynamically during runtime. For example, a particular application may have a high likelihood of missing in the L1 and L2 caches, so that a runahead poison policy that injects poison upon an L1 miss may be applied, while a different application may have a high likelihood of hitting in the L2 cache following an L1 miss, so that a runahead poison policy that waits for a hit/miss response from the L2 cache before injection poison may be applied instead.

Accordingly, in some embodiments, selection of a runahead poison policy may be based, at least in part, on a relative rate of hits to misses in a selected cache level of a hierarchical cache/cache hierarchy. For example, in some embodiments, a runahead poison policy may be selected according to a miss rate in a higher level cache (e.g., an L2 cache) relative to a miss rate in a lower level cache (e.g., an L1 cache). Without wishing to be bound by theory, in some of such embodiments it may be more efficient to immediately inject poison in situations where a miss in an L1 cache is likely to also miss in an L2 cache instead of delaying to determine if the L2 cache will miss as explained in the examples provided above.

Figure 4:
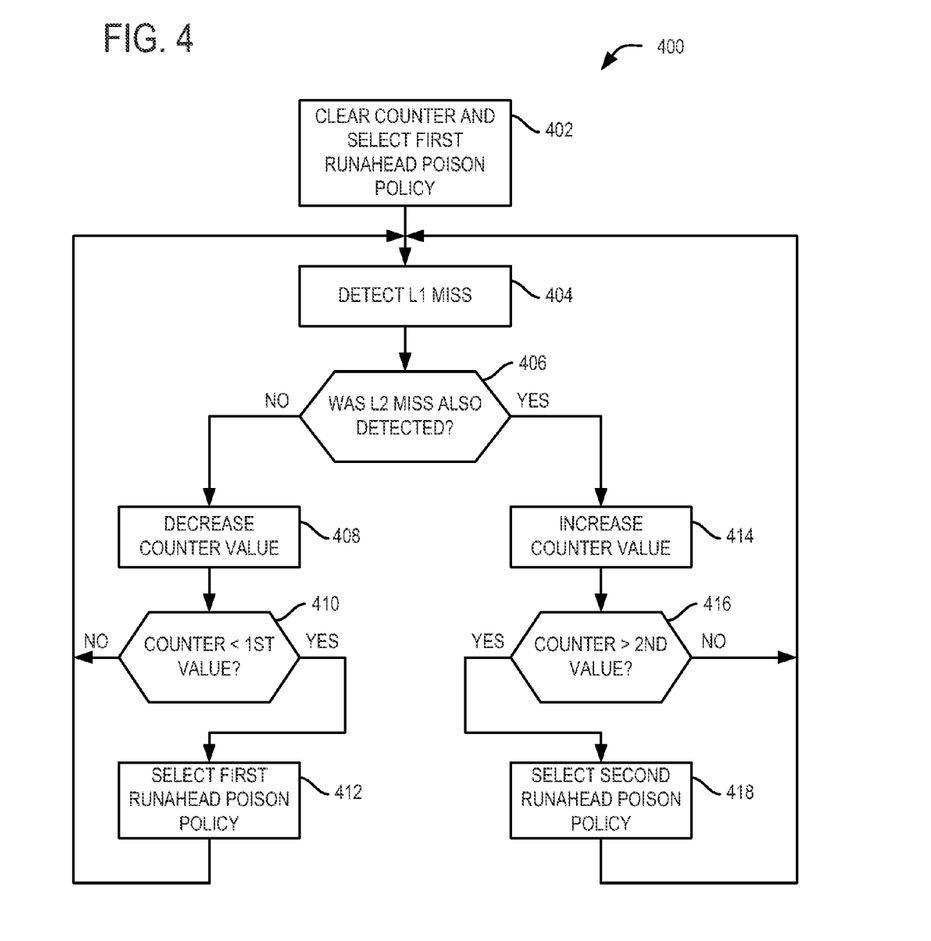
FIG. 4 depicts yet another example method of selecting a runahead poison policy from a plurality of runahead poison policies during microprocessor operation according to an embodiment of the present disclosure.

For example, FIG. 4 shows a flow chart for a method 400 of selecting a runahead poison policy from a plurality of runahead poison policies during microprocessor operation. It will be appreciated that embodiments of method 400 may be performed by any suitable hardware and software, including the hardware and software described herein. In some embodiments, method 400 may be configured to be restarted for an individual instance of a runahead operation. In some other embodiments, method 400 may be configured to operate over comparatively longer durations, so that an instance of method 400 may include a plurality of runahead operation instances. It will be appreciated that portions of the processes described in method 400 may be omitted, reordered, and/or supplemented without departing from the scope of the present disclosure. The counter scheme described in method 400 is an example of an approach for comparing hit rates. It will be appreciated that any suitable scheme for comparing hit rates may be employed without departing from the scope of the present disclosure.

At 402, method 400 includes clearing a counter and selecting a first runahead poison policy. For example, in some embodiments, method 400 may select a runahead poison policy where, upon detecting a miss in the L1 cache, the microprocessor delays processing subsequent instructions until it is determined that a hit or miss occurs in the L2 cache. Method 400 includes, at 404, detecting an L1 miss, and at 406, determining whether an L2 miss is also detected. If a miss in the L2 cache is not detected, for example, because a hit was detected in the L2 cache, method 400 continues to 408.

At 408, method 400 includes decreasing a counter value. In some embodiments, the counter value may be decreased by an integer, though it will be appreciated that the counter may be decreased by any suitable value without departing from the scope of the present disclosure. At 410, determining whether the counter value is less than a first threshold value. If the counter value is not less than the first threshold value, method 400 returns to 404. If the counter value is less than the first threshold value, method 400 continues to 412 where a first runahead poison policy is selected. In this example, method 400 may select a runahead poison policy where, upon detecting a miss in the L2 cache, the microprocessor delays processing subsequent instructions until it is determined that a hit or miss occurs in the L2 cache as the first runahead poison policy. Once the first runahead poison policy is selected method 400 then returns to 404.

Turning back to 406, if it was determined that an L2 miss was detected, method 400 continues to 414 where the counter value is increased. In some embodiments, the counter value may be increased by an integer, though it will be appreciated that the counter may be increased by any suitable value without departing from the scope of the present disclosure. At 416, method 400 determines whether the counter value is greater than a second threshold value. If not, method 400 returns to 404. If the counter value is less than a second threshold value, method 400 continues to 418, where a second runahead poison policy is selected. In this example, method 400 may select a runahead poison policy where, upon detecting a miss in the L1 cache, the microprocessor immediately injects poison and does not delay processing subsequent instructions until it is determined that a hit or miss occurs in the L2 cache as the second runahead poison policy. Once the second runahead poison policy is selected method 400 then returns to 404.

It will be appreciated that the first and second threshold values may be set to any suitable value(s) without departing from the scope of the present disclosure. In some embodiments, the first and second threshold values may have different values to introduce hysteresis, potentially avoiding instability that may result from frequent changes in runahead poison policy. In the embodiment shown in FIG. 4, counter values less than the first threshold value trigger selection of the first runahead poison policy, while counter values greater than the second threshold value trigger selection of the second runahead poison policy.

While the embodiment of method 400 discussed above relates to an example that alternates between two runahead poison policies, it will be appreciated that any suitable number of runahead poison policies may be employed without departing from the scope of the present disclosure. For example, in some embodiments, method 400 may be used with three or more runahead poison policies as adapted to additional levels of a cache hierarchy.

Figure 5:
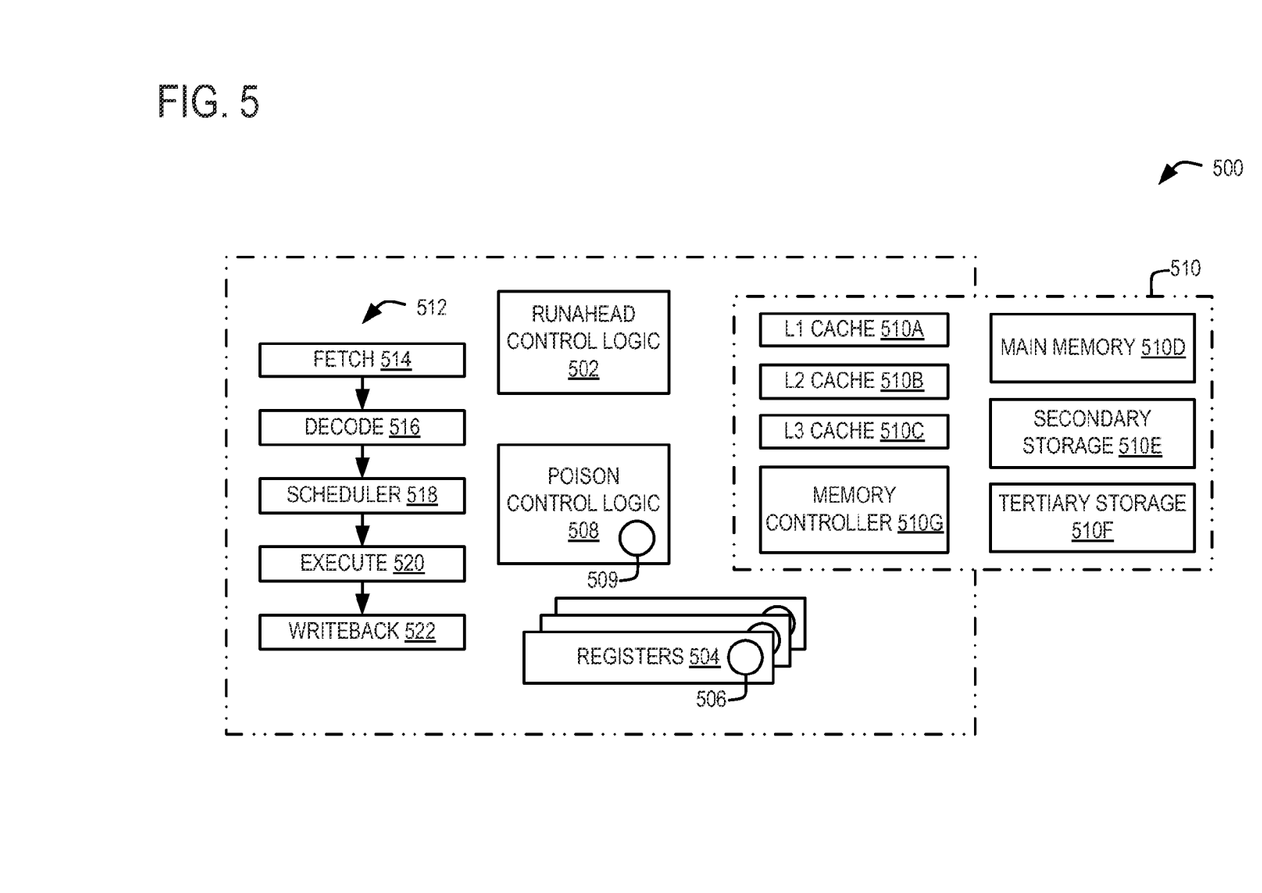
FIG. 5 schematically shows an example microprocessor operative to selectively implement, during runtime, any of a plurality of runahead poison policies according to an embodiment of the present disclosure.

It will be appreciated that the methods disclosed herein may be performed by any suitable microprocessor. For example, FIG. 5 schematically depicts an embodiment of a microprocessor 500 that may be employed in connection with the systems and methods described herein. The embodiment of microprocessor 500 shown in FIG. 5 depicts runahead control logic 502. Runahead control logic 502 controls entry into and exit from runahead mode for microprocessor 500. In some embodiments, runahead control logic 502 may also control memory operations related to entry and exit from runahead. For example, on entry to runahead, portions of microprocessor 500 may be checkpointed to preserve the state of microprocessor 500 while a non-checkpointed working state version of microprocessor 500 speculatively executes instructions during runahead. In some of such embodiments, runahead control logic 502 may restore microprocessor 500 to the checkpointed state upon exit from runahead.

Microprocessor 500 also includes one or more processor registers 504. In some embodiments, registers 504 may be included in a general purpose register file or otherwise suitably distributed within microprocessor 500. Registers 504 store data and/or instructions used during operation. For example, a pipeline stage may obtain data from an input register, perform a specified operation using the obtained data, and then store the result at a destination register. It will be appreciated that the labels "destination register" and "input register" are relative terms. For example, a destination register for a first operation may act as an input register for another operation; likewise, an input register for one operation may have served as a destination register for a prior operation, and so on.

In the embodiment shown in FIG. 5, each register 504 is augmented with a poison bit 506. Each poison bit 506 is configured so that its value may indicate the trustworthiness of an associated location in register 504. Each poison bit 506 is configured to indicate the validity/invalidity of the data or instruction included in the associated register 504 during runahead operation.

The embodiment of microprocessor 500 shown in FIG. 5 also includes poisoning control logic 508 operative to determine whether a destination register may contain potentially invalid information (e.g., based on a poisoned input register, an invalid calculation result such as a divide-by-zero, etc.). If it is determined that the destination register will contain potentially invalid information, poisoning control logic 508 applies poison to the destination register.

Poisoning control logic 508 is also configured to select from a plurality of runahead poison policies during microprocessor operation. For example, poisoning control logic 508 may select a runahead poison policy operative to inject poison immediately upon detection of a miss in an L1 cache and later select another runahead poison policy operative to wait to inject poison until it is determined that a miss in an L1 miss will also result in a miss in an L2 cache. Poisoning control logic 508 may be configured to assess microprocessor performance during runahead and/or normal operation as a part of the selection and/or application of the runahead poison policies.

In the embodiment shown in FIG. 5, poisoning control logic 508 includes a poisoning control bit 509. Poisoning control bit 509 may be used to track and/or apply a particular runahead poison policy. For example, setting poisoning control bit 509 to a first value may cause poisoning control logic 508 to apply a first runahead poison policy. Altering poisoning control bit 509 to another value may cause poisoning control logic 508 to select and/or apply a different runahead poison control policy.

While the embodiment shown in FIG. 5 depicts poisoning control logic 508 as an entity separate from other portions of microprocessor 500 for clarity, it will be appreciated that some or all of the functions of poisoning control logic 508 may be distributed among suitable portions of microprocessor 500. For example, in some embodiments, poisoning control logic 508 may be distributed among portions of scheduling logic and/or among portions of execution logic. For example, in some embodiments, poisoning control logic 508 may include a self-contained hardware unit comprising poisoning control bit 509, logic and/or software for measuring microprocessor performance during runahead. In some other embodiments, poisoning control logic 508 may include poisoning control bit 509 and suitable poison control algorithms for selecting from the plurality of runahead poison policies and may be operative to receive processor performance information from other aspects of microprocessor 500. In still other embodiments, poisoning control logic 508 may include poisoning control bit 509 and may control selection of a runahead poison policy using poison control software implemented in application software, an operating system software, and/or in a software layer invisible to the operating system (e.g., in firmware or a translation layer of a translation architecture).

The embodiment of microprocessor 500 depicted in FIG. 5 also includes a memory hierarchy 510, which may include an L1 processor cache 510A, an L2 processor cache 510B, an L3 processor cache 510C, main memory 510D (e.g., one or more DRAM chips), secondary storage 510E (e.g., magnetic and/or optical storage units) and/or tertiary storage 510F (e.g., a tape farm). It will be understood that the example memory/storage components are listed in increasing order of access time and capacity, though there are possible exceptions.

A memory controller 510G may be used to handle the protocol and provide the signal interface required of main memory 510D and to schedule memory accesses. The memory controller can be implemented on the processor die or on a separate die. It is to be understood that the memory hierarchy provided above is non-limiting and other memory hierarchies may be used without departing from the scope of this disclosure.

Microprocessor 500 also includes a pipeline, illustrated in simplified form in FIG. 5 as pipeline 512. Pipelining may allow more than one instruction to be in different stages of retrieval and execution concurrently. Put another way, a set of instructions may be passed through various stages included in pipeline 512 while another instruction and/or data is retrieved from memory. Thus, the stages may be utilized while upstream retrieval mechanisms are waiting for memory to return instructions and/or data, engaging various structures such as caches and branch predictors so that other cache misses and/or branch mispredicts may potentially be discovered. This approach may potentially accelerate instruction and data processing by the microprocessor relative to approaches that retrieve and execute instructions and/or data in an individual, serial manner.

As shown in FIG. 5, pipeline 512 includes fetch logic 514, decode logic 516, scheduler logic 518, execution logic 520, and writeback logic 522. It will be appreciated that the logic portions displayed in the embodiment of pipeline 112 shown in FIG. 5 are provided for illustrative purposes only and that the functionality described in more detail below may be arranged in any suitable manner. For example, some embodiments of pipeline 512 may include individually pipelined portions within one or more of the execution units (e.g., one or more of fetch logic 514, decode logic 516, and so on, may include individually pipeline portions) while some embodiments may combine portions of two or more logic portions within a single pipeline execution unit.

Fetch logic 514 retrieves instructions from the memory hierarchy 510, typically from either unified or dedicated L1 caches backed by L2-L3 caches and main memory. Decode logic 516 decodes the instructions, for example by parsing opcodes, operands, and addressing modes. Upon being parsed, the instructions are then scheduled by scheduler logic 518 for execution by execution logic 520.

In some embodiments, scheduling logic 518 may be configured to schedule instructions for execution in the form of instruction set architecture (ISA) instructions. Additionally or alternatively, in some embodiments, scheduling logic 518 may be configured to schedule bundles of micro-operations for execution, where each micro-operation corresponds to one or more ISA instructions or parts of ISA instructions. It will be appreciated that any suitable arrangement for scheduling instructions in bundles of micro-operations may be employed without departing from the scope of the present disclosure. For example, in some embodiments, a single instruction may be scheduling in a plurality of bundles of micro-operations, while in some embodiments a single instruction may be scheduling as a bundle of micro-operations. In yet other embodiments, a plurality of instructions may be scheduling as a bundle of micro-operations. In still other embodiments, scheduling logic 518 may schedule individual instructions or micro-operations, e.g., instructions or micro-operations that do not comprise bundles at all.

As shown in FIG. 5, the depicted embodiment of pipeline 512 includes execution logic 520 that may include one or more execution stages configured to execute instructions issued by scheduling logic 518. Any suitable number and type of execution stages may be included within execution logic 520. Once processed by execution logic 520, completed instructions may be stored in preparation for commitment by writeback logic 522. Writeback logic 522 alters the architectural state of microprocessor 500 by committing completed instructions to memory. Put another way, writeback logic 522 performs commit functionality for microprocessor 500.

It will be understood that the above stages shown in pipeline 512 are illustrative of a typical RISC implementation, and are not meant to be limiting. For example, in some embodiments, the fetch logic and the scheduling logic functionality may be provided upstream of a pipeline, such as compiling VLIW instructions or instruction-set translation. In some other embodiments, the scheduling logic may be included in the fetch logic and/or the decode logic of the microprocessor. More generally a microprocessor may include fetch, decode, and execution logic, each of which may comprise one or more stages, with mem and write back functionality being carried out by the execution logic. The present disclosure is equally applicable to these and other microprocessor implementations, including hybrid implementations that may use VLIW instructions and/or other logic instructions.

In the described examples, instructions may be fetched and executed one at a time, possibly requiring multiple clock cycles. During this time, significant parts of the data path may be unused. In addition to or instead of single instruction fetching, pre-fetch methods and multi-issue methods (e.g., superscalar methods) may be used to enhance performance and avoid latency bottlenecks associated with read and store operations (e.g., the reading of instructions and loading such instructions into processor registers and/or execution queues). Accordingly, it will be appreciated that any suitable manner of fetching, scheduling, and dispatching instructions may be used without departing from the scope of the present disclosure.

It will be appreciated that methods described herein are provided for illustrative purposes only and are not intended to be limiting. Accordingly, it will be appreciated that in some embodiments the methods described herein may include additional or alternative processes, while in some embodiments, the methods described herein may include some processes that may be reordered or omitted without departing from the scope of the present disclosure. Further, it will be appreciated that the methods described herein may be performed using any suitable hardware including the hardware described herein.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

What is claimed is:

1. A method for operating a microprocessor, comprising:
assessing microprocessor performance during microprocessor operation;
based upon the microprocessor performance, dynamically selecting one of a plurality of runahead poison policies; and
operating said microprocessor according to said one of a plurality of runahead poison policies;
where the plurality of runahead poison policies comprises a first runahead poison policy operative to cause the microprocessor to inject runahead poison upon determining a miss in a first cache level during runahead and where the second runahead poison policy is operative to cause the microprocessor to wait to inject poison until determining a miss in a second cache level during runahead.

2. The method of claim 1, where assessing microprocessor performance includes for each of the plurality of runahead poison policies, generating performance information associated with that runahead poison policy during a time interval that runahead poison policy is implemented.

3. The method of claim 2, where dynamically selecting one of the plurality of runahead poison policies includes selecting that one based upon a comparison of the performance information.

4. The method of claim 1, further comprising selecting another of the plurality of runahead poison policies during microprocessor operation based upon a change in microprocessor performance.

5. A microprocessor, comprising:
a cache hierarchy; and
an execution component that executes:
runahead control logic to cause the microprocessor to enter runahead in response to a miss in the cache hierarchy; and
poison control logic to dynamically implement a second runahead poison policy as one of a plurality of runahead poison policies operative to manage runahead poison injection during runahead,
wherein selecting the second runahead poison policy includes selecting the second runahead poison policy based upon microprocessor performance measured during operation of the microprocessor;
where the plurality of runahead poison policies comprises a first runahead poison policy operative to cause the microprocessor to inject runahead poison upon determining a miss in the first cache level during runahead and where the second runahead poison policy is operative to cause the microprocessor to cause the microprocessor to wait to inject poison until determining a miss in the second cache level during runahead.

6. The microprocessor of claim 5, where the cache hierarchy includes a first cache level and a second cache level, the first cache level being hierarchically lower than the second cache level.

7. The microprocessor of claim 5, further comprising selecting the first runahead poison policy if a miss rate in a second cache level of the cache hierarchy exceeds a hit rate in the second cache level, and selecting the second runahead poison policy if the hit rate in the second cache level exceeds the miss rate in the second cache level.

8. The microprocessor of claim 5, where the poison control logic includes selection logic operative to select the second runahead poison policy based upon microprocessor performance.

9. The microprocessor of claim 8, where the selection logic includes: performance assessment logic operative to generate first performance information during a first time interval for which the first runahead poison policy is implemented and second performance information during a second time interval for which the second runahead poison policy is implemented; and comparison logic operative to compare the first performance information with the second performance information.

10. The microprocessor of claim 9, where the comparison logic is operative to compare a most recent first performance information to a most recent second performance information.

* * * * *